Oct. 17, 1972     C. F. GLASGOW     3,698,915
METHOD FOR MAKING POTATO CHIP-TYPE FOOD PRODUCT
Filed Aug. 19, 1970
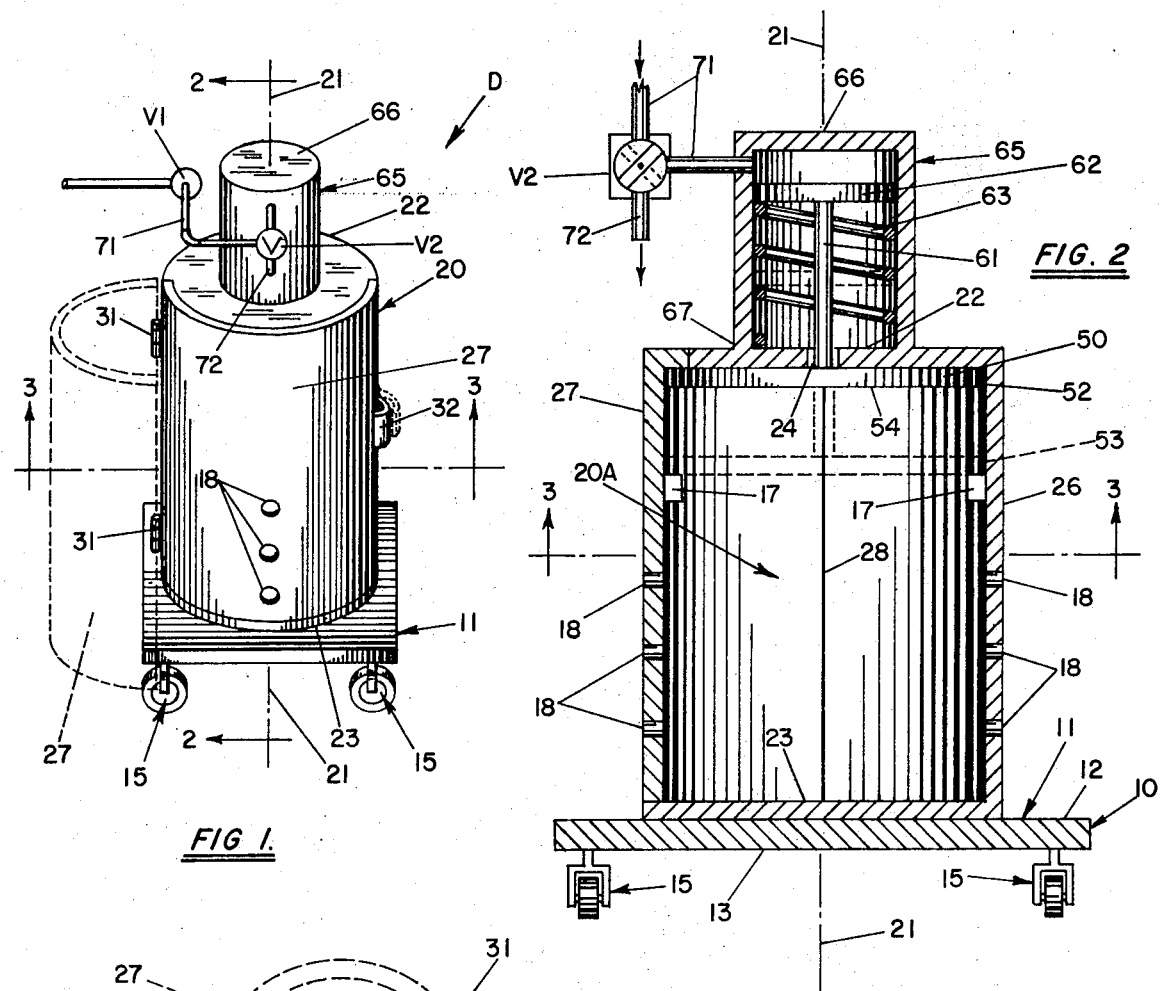
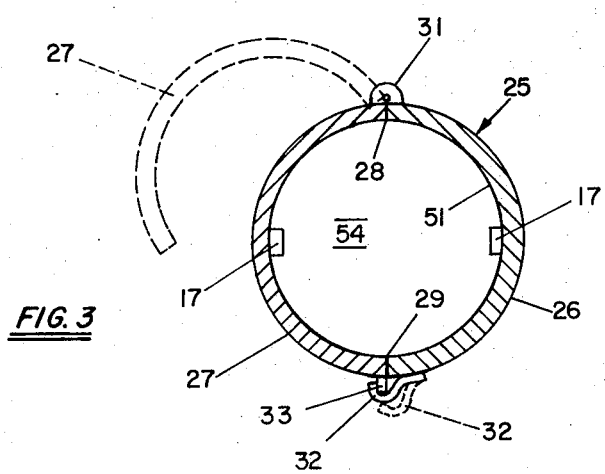
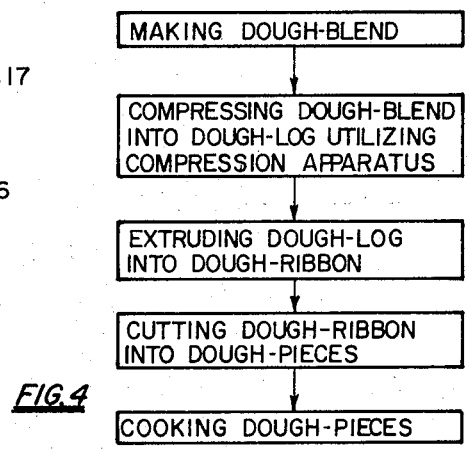
FIG. 4
- MAKING DOUGH-BLEND
- COMPRESSING DOUGH-BLEND INTO DOUGH-LOG UTILIZING COMPRESSION APPARATUS
- EXTRUDING DOUGH-LOG INTO DOUGH-RIBBON
- CUTTING DOUGH-RIBBON INTO DOUGH-PIECES
- COOKING DOUGH-PIECES
COLIN F. GLASGOW
INVENTOR
BY George R. Plummer
ATTORNEY United States Patent Office 3,698,915
Patented Oct. 17, 1972

3,698,915
METHOD FOR MAKING POTATO CHIP-TYPE FOOD PRODUCT
Colin F. Glasgow, Billings, Mont., assignor to Pate Foods, Inc., South Beloit, Ill.
Filed Aug. 19, 1970, Ser. No. 64,973
Int. Cl. A23l 1/12
U.S. Cl. 99—100 P     3 Claims

ABSTRACT OF THE DISCLOSURE

This invention relates to a method for producing a chip-type fried food product containing as a major portion thereof potato flakes which are in particulate form distributed throughout a farinaceous flour matrix. The method comprises the following steps in order: making a non-gelatinous crumbly dough-blend; loading a batch of said dough-blend into a novel dough compression apparatus for controllably compressing and de-aerating same into a non-gelatinous relatively abrasive-resistant dough-log; extruding the dough-log into an elongate dough-ribbon; cutting the dough-ribbon into relatively short dough-pieces; and cooking the non-gelatinous dough-pieces under controlled conditions to produce a non-puffy relatively compact chip-type food product.

---

The prior art describes two generic physical forms of cooked crispy vegetable snack food products, the first physical form being of the "porous puff" class wherein visible air voids comprise substantially greater than 60% of the volume of a rotund non-laminar food product, and the second physical form being of the "non-spongy" laminar or chip-type class wherein air voids comprise substantially less than about 40% of the food product volume. This invention is directed exclusively to snack food products of the laminar chip-type "non-spongy" physical form that are more economical to ship and store than are the rotund "porous puff" products. The "non-spongy" chip-type food products, as in the present invention, lend themselves well to buffet dipping and coating with viscous-liquid or semi-solid confections, cheeses, and seasoned sauces; the rotund "porous puff" form food products (specifically excluded from the teachings of this invention) are too bulky, porous, and puffy to permit practical and gracious use thereof for buffet dipping and coating. Moreover, the non-chip rotund "porous-puff" form food products require special manufacturing processes which are inherently inimical to the provision of a compact "non-spongy" laminar or chip form of oil-fried vegetable snack food product.

"Non-spongy" chip-type vegetable snack products of the prior art are of two basic varieties, both of said prior art varieties being readily distinguishable in physical form, taste, and manufacturing processing from the chip-type product of the present invention. The first basic variety is the traditional sliced vegetable, i.e. a potato chip, wherein raw vegetables are cut into thin slices and deep fat dried in hot oil. However, the traditional potato chip comprises a very starchy and fragile physical structure, and the taste features thereof reflect entirely the combination of fried vegetable and oleaginous frying medium. The second basic prior art variety comprises a fried dough product, said dough comprising a gelatinous mixture of various pulverized edible flours. Food products resulting from oil-frying of such prior art gelatinous doughs are apt to be hard, glassy, and brittle in physical structure. Moreover, they have the objectionable tendencies to fracture and crumble during shipment and storage, are apt to be too brittle for buffet use, are difficult to chew and masticate, and are generally of a very bland, mealy, and oily taste.

It is accordingly the general object of the present invention to provide a crispy chip-type oil-fried vegetable food product having a "non-spongy" chip-like physical form, that avoids the several objectionable features normally associated with "non-spongy" chip-type food products of the prior art, and that provides unique physical features and flavor characteristics.

It is a specific object of the present invention to provide such type chip-type oil-fried vegetable food product which is characterized by a high degree of qualitative uniformity that is generally unattainable with the processing operations of the prior art.

It is yet another object of the present invention to provide a "non-spongy" oil-fried chip-type vegetable food product having unusual taste and flavor characteristics afforded by novel combinations and processing techniques involving farinaceous flours, dehydrated potato flakes, seasonings, special cooking oils, and other possible additives.

It is a further object of the present invention to provide a chip-type snack food from a special Scandinavian potato "Lefse" dough which is shaped and oil-fried to provide a chip-type snack food product which possesses a uniformity and flavor superior to and markedly different from that of chip-type snack foods known heretofore.

It is another object of the present invention to provide an oil-fried chip-type vegetable food product that is exceedingly stable under storage conditions and that is unusually and surprisingly resistant to the development of rancidity and staleness therein.

With the above and other objects and advantages in view, which will become more apparent as this description proceeds, the method for producing an unleavened chip-type food product comprises the following steps in order: making an amorphous structurally-discontinuous non-gelatinous crumbly dough-blend having a solids content exceeding 50% and wherein the major gravimetric portion of the solids content comprises particulate potato flakes; loading a finite-volume of said dough-blend into a dough compression apparatus, such as "D" herein described; controllably compressing the dough-blend load to less than 85% the said finite-volume to provide a self-sustaining non-gelatinous relatively abrasive-resistant dough-log having a regular transverse cross-sectional-area of a fixed-areal-quantity along the length thereof; extruding said dough-log into an elongate self-sustaining dough-ribbon having a regular cross-sectional-area that is less than 10% the said fixed-areal-quantity; cutting said dough-ribbon into relatively short length dough-pieces; and cooking said dough-pieces under controlled conditions to produce a non-puff chip-type food product having a regular cross-sectional-area that is less than twice that for the dough-pieces and wherein the potato flakes remain in visually discernible particulate form.

In the drawing, wherein like characters refer to like parts in the several views, and in which:

FIG. 1 is a perspective view of a representative form of a novel dough compression apparatus which is employable with the food production method of the present invention.

FIG. 2 is a sectional elevational view taken along line 2—2 of FIG. 1.

FIG. 3 is a sectional plan view taken along lines 3—3 of FIGS. 1 and 2.

FIG. 4 is a flow-sheet diagram schematically illustrating the chip-type food production method of the present invention.

Referring initially to FIGS. 1–3, the dough compression apparatus D generally comprises an elongate hollow receptacle, e.g. 20, extending along an upright longitudinal-axis 21, the receptacle including a fixed forward-wall 23 transversely intersecting the longitudinal-axis 21, and a suitable closeable access opening therethrough, e.g. pivotal member 27, to permit loading of the dough-blend and removal of the dough-log; a longitudinally reciprocatably movable transverse-plate 50 transversely intersecting the longitudinal-axis 21, together with stop-means, e.g. 22, 17, to appropriately longitudinally compress the dough-blend into a dough-log; and powering means, e.g. 71, for longitudinally reciprocating transverse-plate 50 between two selected stations therefor, e.g. 52 and 53.

Dough compression apparatus D having the upright receptacle 20, herein concentrically surrounding vertical longitudinal-axis 21, comprises a rollable horizontal base member 10 which serves to elevate the receptacle 20 a few inches above the floor and to render the apparatus rollably portable between food product processing steps. Base member 10 herein comprises a horizontal rectangular base-plate 11 having a substantially planar horizontal upper surface 12 and having a generally horizontal lower surface 13. Extending downwardly from base-plate lower surface 13 is a plurality (herein four) rollers 15, each roller being additionally revolvable about the vertical axis thereof whereby apparatus D is freely rollable in all radial directions from longitudinal-axis 21.

The elongate hollow receptacle 20 shown is of generally cylindrical form having a circular side-wall 25 (comprising two hemi-cylindrical abuttable segments 26 and 27) annularly surrounding longitudinal-axis 21. Receptacle 20 has a circular horizontal forward-wall 23 transversely intersecting longitudinal-axis 21, forward-wall 23 resting upon base-plate upper surface 12 and being attached thereto (as by welding) whereby forward-wall 23 has a fixed elevation along longitudinal-axis 21. Receptacle 20 has a hollow interior chamber 20A defined by circular annular side-wall 25 and extending rearwardly upwardly from fixed forward-wall 23. Thus, receptacle chamber 20A has a regular transverse cross-sectional-area of a fixed-areal-quantity extending upwardly rearwardly from forward-wall 23 along rigid side-wall 25 to the transverse-plate upper first-station 52. Receptacle 20 includes horizontal rearward-wall 22 (having central opening 24), said rearward-wall 22 transversely intersecting longitudinal-axis 21 and being affirmatively attached to side-wall 25 (as to segment 26 only) whereby stationary rearward-wall 22 is of fixed elevation immediately above first-station 52.

Transverse-plate 50 has a peripheral-boundary 51 circularly concentrically surrounding longitudinal-axis 21, said transverse-plate 50 being disposed within chamber 20A of receptacle 20 along longitudinal-axis 21. The peripheral-boundary 51 thereof is directly slidable along the receptacle annular side-wall 25 between vertically separated stations 52 and 53. There are stop-means to limit the extent of longitudinal travel for transverse-plate 50 between said stations 52 and 53. For example, the stop-means to determine upper first-station 52 herein comprises the rearward-wall 22 abuttable against the transverse-plate 50. Three alternative stop-means are suggested herein to determine lower second-station 53. There might be the opposed lugs 17 integrally attached to the respective side-wall segments 26 and 27 and adapted to abut the planar horizontal lower surface 54 of transverse-plate 50. Analagously, piston-head 62 might be abuttable against rearward-wall 22. In the absence of lugs 17 or piston-head 62, the empirically chosen size of the dough-blend load for chamber 20A would determine second-station 53.

There is an upright shaft 61 extending rearwardly integrally from transverse-plate 50 along longitudinal-axis 21 through the rearward-wall central opening 24, and transverse-plate 50 is longitudinally motivated through said shaft 61. The vertical distance between receptacle forward-wall 23 to transverse-plate 50 at its lower second-station 53, e.g. lugs 17, as compared to the vertical distance between forward-wall 23 and transverse-plate 50 at upper first-station 52, provides a ratio within the range of 60% to 85% (and preferably at about 78%). Thus, a finite-volume of dough-blend placed within receptacle chamber 20A might be longitudinally compressed (while remaining constant in transverse cross-sectional-area) to less than 85% said finite-volume. The receptacle side-wall 25 below second-station 53 is provided with at least one, and herein a plurality of aeration-holes 18 to permit compressibly released gases from the dough-blend to be exhausted from receptacle 20.

There are closeable access means for receptacle 20 to permit the finite load of dough-blend to be inserted into receptacle internal chamber 20A (when transverse-plate 50 is at first-station 52), and to permit the subsequently compressed form thereof, i.e. the dough-log, to be retrieved from internal chamber 20A. Herein, the closeable access means is provided by making the receptacle side-wall 25 into two hemi-cylindrical segments 26 and 27, the segments being firmly abuttable at two diametrically separated vertical juncture-lines 28 and 29. One segment 26 is immovable, as by integral semi-ciricular attachment to rearward-wall 22 and to forward-wall 23. The second segment 27 is pivotably attached to first segment 26 along juncture-line 28 with a pair of hinges 31. Thus, as indicated in phantom line in FIGS. 1 and 3, hemi-cylindrical thin-walled segment 27 is freely pivotal about juncture-line 28 away from stationary segment 26 to permit loading of the dough-blend and the retrieval of the compressed dough-log. Attached to segment 26 is a springy clamp 32 adapted to removably engage ear 33 of segment 27 to maintain abutment of segments 26 and 27 along juncture-line 29 during compression of the dough-blend with forwardly movable transverse-plate 50.

There are powering means actuatably connected to transverse-plate 50 for causing same to travel longitudinally forwardly from the upper first-station 52 to the lower second-station 53, thus compressing the dough-blend into a dough-log. The preferred powering means herein utilized a source of compressed air suppliable along conduit 71 together with a piston (comprising piston-head 62 attached to shaft 61), said piston being vertically reciprocatable along a cylinder 65. Cylinder 65 circularly concentrically surrounds longitudinal-axis 21, and has an open lower forward end 67 integrally attached to receptacle rearward-wall 22 and has a closed horizontal upper rearward end 66. Piston-head 62 is slidably disposed within cylinder 65 and is longitudinally reciprocatable therealong. There are means to normally urge piston-head 62 upwardly rearwardly, such as a helical spring 63 surrounding shaft 61, or alternatively, as vacuum means upwardly rearwardly of piston-head 62. Conduit 71, interrupted first by pressure-regulating valve $V_1$ and then by three-way valve $V_2$, enters through cylinder 65 near the upper end 66. Thus, as valve $V_1$ is set to some appropriate value (such as 250 p.s.i.), compressed air travels to three-way valve $V_2$ which (at the "on" position indicated in phantom line in FIG. 2) then proceeds into cylinder 65 moving piston-head 62 and connected transverse-plate 50 downwardly forwardly along longitudinal-axis 21 to compress the dough-blend into a dough-log. Then, with valve $V_2$ manually turned to the "off" position indicated in solid line in FIG. 2, the compressed air between piston-head 62 and cylinder upper end 66 escapes through valve exhaust 72 permitting piston-head 62 to rise, either by virtue of spring 63, or the differential air pressure on opposite sides of piston-head 62, or both. Finally, segment 27 is pivoted about hinges 31 and the dough-log is removed.

Having now described the dough compression apparatus "D", is use for producing a chip-type food product will not be described, reference being had to the FIG. 4 flow sheet diargam.

The following ingredients were blended together to prepare about twenty-five pounds of a homogeneous amorphous dough-blend:

100.0 parts by weight dehydrated cold-water rehydratable dried potato flakes.
60.0 parts by weight wheat flour having protein of about 10% by weight.
140.0 parts by weight cold water (65° F.).
5.0 parts by weight sodium chloride.
6.7 parts by weight rice flouur.
6.7 parts by weight corn flour.
3.3 parts by weight calcium stearate.

The resultant dough-blend has the desired solids content of about 56% by weight and the temperature within the range of 65–70° F. The dough-blend has the following further physical characteristics, to wit: is opaque; crumbly and structurally-discontinuous, i.e. not sufficiently cohesive and abrasive-resistant to remain self-sustaining when handled; non-gelatinous; and the particulate potato flakes are hydrated but remain undissolved.

The aforedescribed dough-blend is loaded into internal chamber 20A of dough compression apparatus "D" with transverse-plate 50 at the upper first-station 52. The side-wall 25 (defining internal chamber 20A) circularly centrically surrounds axis 21 at a radius of about 3½ inches, said radius remaining constant from forward-wall 23 to the transverse-plate upper first-station 52. The vertical distance from first-station 52 to forward-wall 23 is eighteen inches, while the vertical distance between the transverse-plate stations 52 and 63 is four inches. Then, semi-cylindrical segment 27 is "closed" against segment 26 along juncture-line 29 and locked thereagainst with latch 32. Next, compressed air is utilized to move transverse-plate 50 forwardly to lower second-station 53 thereby compressing the twenty-five pounds dough-blend into a cylindrical dough-log having a length along longitudinal axis 21 of fourteen inches, and a constant radius therefrom of the 3½ inches, i.e. about 38½ square inches. Semi-cylindrical segemnt 27 is "opened" and the resultant dough-log is removed from chamber 20A. Examination of the dough-log reveals it to be: opaque; more abrasive-resistant than the dough-blend and hence readily handleable without crumbling; non-gelatinous; a solids content of about 56%, and a temperature less than 75° F., and hence, wherein the particular potato flakes are hydrated but remain undissolved.

Before about one hour has elapsed from the completion of the dough-blending step so as to ensure against gelatinization of the wheat flour component, the dough-log is extruded at pressures exceeding 100 p.s.i. in a conventional food extruding device to form a self-sustaining non-gelatinous dough-ribbon, having a regular transverse cross-sectional-area. The dough-ribbon has a regular transverse cross-sectional-area, herein of rectangular shape one inch wide by ⅛ inch thick (one-eighth square inch). The dough-ribbon emerging from the herein rectangular extrusion die is carried by a conveyor belt, which is moving away from the die at a suitable rate of speed. The so conveyed dough-ribbon is cut into dough-pieces of about 1½ inch lengths.

The dough-pieces are cooked by floating on cottonseed oil having a temperature of about 330–340° F. for about forty-five seconds to result in the chip-type food product. Under these cooking conditions the dough-pieces have swollen volumetrically less than 50% and a non-porous chip-type food product results. Finally, the cooked product is removed from the oleaginous cooking medium, drained of excess oils, salted or otherwise garnished, and then packed into cellophane bags or similar hermetically sealed containers. The resultant food product has the following desirable physical characteristics: the product has a delicious taste readily distinguishable from potato chips, from the snack type farinaceous foods, and from "puffed" grain foods; liquid oil content is gravimetrically less than 35%; the texture is relatively dense and crispy compared to "puff-type" products; and the major gravimetric proportion consists of visually discernible potato flakes, the potato flakes remaining in undissolved particulate form.

From the foregoing, the construction and operation of the dough compression apparatus and the method will be readily understood and further explanation is believed to be unnecessary. However, since numerous modifications and changes will readily occur to those skilled in the art, it is not desired to limit the invention to the exact construction and method steps shown and described, and accordingly, all suitable modifications and equivalents may be resorted to, falling within the scope of the appended claims.

What is claimed is as follows:

1. A method for producing an unleavened chip-type food product, said method comprising the following steps in order:
   (A) Blending a homogeneous mixture comprising: 100 parts by weight water rehydratable dried potato flakes, 40–70 parts by weight wheat flour, and 80–140 parts by weight water having a temperature within the range of about 40° F. to 80° F. to provide an opaque non-gelatinous crumbly structurally-discontinuous amorphous dough-blend having a temperature with the range of about 40° F. to 80° F. and wherein the potato flakes are in undissolved particulate from within the amorphous dough-blend;
   (B) Loading a finite-volume batch of the amorphous dough-blend into a hollow dough compression apparatus, the elongate annular side-wall of said apparatus surrounding a longitudinal-axis and defining an elongate internal chamber having a regular cross-sectional area representing a fixed-areal-quantity;
   (C) Compressing the said finite-volume batch of the amorphous dough-blend along the apparatus longitudinal-axis to attain a reduced-volume deaerated dough-log form that represents less than about 85% said finite-volume to provide a relatively abrasive-resistant opaque non-gelatinous dough-log having a temperature within the range of about 45° F. to 85° F. and having said regular cross-sectional fixed-areal-quantity, said potato flakes being in undissolved particulate form within the self-sustaining dough-log;
   (D) Extruding said dough-log to provide a self-sustaining dough-ribbon having a regular cross-sectional area representing less than 10% of said fixed-areal-quantity;
   (E) Cutting said dough-ribbon into relatively short length dough-pieces, said potato flakes being in undissolved particulate form within said dough-pieces; and
   (F) Cooking said dough-pieces in an oleaginous liquid medium having a temperature above 330° F. for a time period of 30 to 90 seconds to provide a golden brown chip-type food product, said food product having a regular cross-sectional area less than 20% said fixed-areal-quantity to provide an on-puff chip-type food product wherein the potato flakes are present in particulate undissolved form.

2. The method of claim 1 wherein the homogeneous dough-blend mixture comprises 100 parts by weight said potato flakes, about 60 parts by weight wheat flour having a protein content of about 10% by weight, about 140 parts by weight water at 65° F., about 5 parts by weight sodium chloride, about 6.7 parts by weight rice flour, about 6.7 parts by weight corn flour, and about 3.3 parts by weight calcium stearate.

3. The method of claim 2 wherein the dough-blend batch is compressed to about 78% said finite-volume to produce said dough-log; wherein the total time elapsing between blending the dough-blend to cooking the dough-pieces is less than about one hour to maintain the non-gelatinous integrity of the dough-pieces and the particulate nature therein of the potato flakes; and wherein the dough-pieces are cooked for about forty-five seconds at about 335° F. to provide the desired chip-type food product.

References Cited

UNITED STATES PATENTS

| | | | |
|---|---|---|---|
| 3,361,573 | 1/1968 | Reinertsen | 99—83 |
| 3,451,822 | 6/1969 | Fast et al. | 99—207 X |
| 3,468,673 | 9/1969 | Keller | 99—100 P |
| 3,109,739 | 11/1963 | Hilton | 99—100 P |
| 3,539,356 | 11/1970 | Benson et al. | 99—100 P |

S. LEON BASHORE, Primary Examiner

A. D'ANDREA, JR., Assistant Examiner

U.S. Cl. X.R.

9—98, 207